(12) United States Patent
Desai

(10) Patent No.: US 10,934,437 B2
(45) Date of Patent: Mar. 2, 2021

(54) ANTI-DUST AND EASILY DISPERSIBLE PIGMENT

(71) Applicant: M/S KOEL COLOURS PVT. LTD., Mumbai (IN)

(72) Inventor: Dhirubhai Desai, Mumbai (IN)

(73) Assignee: M/S KOEL COLOURS PVT. LTD., Mumbai (IN)

( * ) Notice: Subject to any disclaimer, the term of this patent is extended or adjusted under 35 U.S.C. 154(b) by 343 days.

(21) Appl. No.: 16/003,911

(22) Filed: Jun. 8, 2018

(65) Prior Publication Data

US 2019/0352512 A1    Nov. 21, 2019

Related U.S. Application Data

(63) Continuation of application No. PCT/IN2018/050313, filed on May 17, 2018.

(30) Foreign Application Priority Data

Apr. 3, 2018    (IN) .............................. 201821012572

(51) Int. Cl.
| | | |
|---|---|---|
| C09C 1/58 | (2006.01) | |
| C09C 1/56 | (2006.01) | |
| C09C 3/08 | (2006.01) | |
| C09D 11/037 | (2014.01) | |
| C09D 101/28 | (2006.01) | |

(52) U.S. Cl.
CPC .................. *C09C 1/58* (2013.01); *C09C 1/56* (2013.01); *C09C 3/08* (2013.01); *C09D 11/037* (2013.01); *C09D 101/284* (2013.01)

(58) Field of Classification Search
None
See application file for complete search history.

(56) References Cited

U.S. PATENT DOCUMENTS

| | | | |
|---|---|---|---|
| 2,065,371 A | 11/1933 | Glaxner | |
| 2,639,225 A | 8/1946 | Venuto | |
| 2,635,057 A | 2/1952 | Jordan | |
| 2,850,403 A | 4/1954 | Day | |
| 3,011,902 A | 5/1954 | Jordan | |
| 2,908,586 A | 2/1957 | Braendle et al. | |
| 3,565,658 A | 2/1971 | Frazier et al. | |
| 3,645,765 A | 2/1972 | Frazier et al. | |
| 3,844,809 A | 10/1974 | Murray | |
| 3,844,811 A * | 10/1974 | Brynko ..................... | B01J 2/08 106/447 |
| 4,102,967 A | 7/1978 | Vanderveen et al. | |
| 4,127,422 A * | 11/1978 | Guzi, Jr. ............... | C09D 17/003 106/412 |
| 5,871,706 A * | 2/1999 | Whitehouse ............. | C08K 3/04 423/449.2 |
| 5,872,177 A | 2/1999 | Whitehouse | |
| 6,171,382 B1 * | 1/2001 | Stubbe .................... | C09D 11/16 106/31.86 |
| 6,569,231 B1 * | 5/2003 | Mathias ............... | C09B 67/0003 106/31.89 |
| 6,623,787 B2 * | 9/2003 | Bowers, Jr. ............... | C09C 1/56 106/31.92 |
| 6,646,023 B1 * | 11/2003 | Nyssen ..................... | A01C 1/06 427/4 |
| 6,916,862 B2 * | 7/2005 | Ota ...................... | C09B 67/0002 523/160 |
| 7,033,429 B2 | 4/2006 | Balliello | |
| 8,716,390 B2 * | 5/2014 | Reisacher ............. | C09B 67/009 524/502 |
| 8,915,998 B2 * | 12/2014 | Gotz ................... | C09B 67/0089 106/476 |
| 2001/0015388 A1 * | 8/2001 | Linde ........................ | C09C 1/24 241/3 |
| 2005/0080171 A1 * | 4/2005 | Reisacher ............. | C09D 11/03 524/115 |
| 2005/0090609 A1 * | 4/2005 | Reisacher ........... | C09B 67/0095 524/612 |
| 2010/0180794 A1 * | 7/2010 | Tauber ...................... | C09C 1/56 106/31.6 |
| 2012/0171104 A1 * | 7/2012 | Arai ...................... | C09D 11/324 423/415.1 |
| 2014/0335138 A1 * | 11/2014 | Goldstein ............ | A61K 8/0241 424/401 |

FOREIGN PATENT DOCUMENTS

| | | |
|---|---|---|
| CA | 2209935 | 7/1996 |
| DE | 19638042 | 10/1997 |
| DE | 19649756 | 10/1997 |
| DK | 176546 | 7/2008 |
| DK | 176562 | 9/2008 |
| EP | 0896986 A1 * | 2/1999 |

(Continued)

OTHER PUBLICATIONS

International Search Report dated Oct. 4, 2018 for PCT/IN2018/050313; 3 pages.*

(Continued)

*Primary Examiner* — Helene Klemanski
(74) *Attorney, Agent, or Firm* — Ryan Alley IP

(57) ABSTRACT

A manufacturing process for an anti-dust and easily dispersible carbon black pigment is disclosed herein. The pigment is convenient to handle and does not generate potentially hazardous airborne particles during transportationor duringany suitable processing conditions employed in end applications in the relevant industry including cosmetics, paint or ink.

19 Claims, No Drawings

(56) References Cited

FOREIGN PATENT DOCUMENTS

| JP | 2001152072 | 6/2001 |
|---|---|---|
| MY | 128313 | 1/2007 |
| WO | WO 2007002030 | 1/2007 |

OTHER PUBLICATIONS

Written Opinion of the International Search Authority dated Oct. 4, 2018 for PCT/IN2018/050313; 6 pages.*
EPO Search Report dated Sep. 19, 2018 for EP 18176700; 2 pages.*
EPO Written Opinion dated Sep. 19, 2018 for EP 18176700; 4 pages.*
English translation of Chinese First Office Action dated May 8, 2020 for CN 110343407; 11 pages.*
English translation of DE 19638042, Oct. 1997; 17 pages.*

\* cited by examiner

ANTI-DUST AND EASILY DISPERSIBLE PIGMENT

CROSS-REFERENCE TO RELATED APPLICATIONS

This application is a continuation of PCT International Patent Application No. PCT/IN2018/050313, recently filed on May 17, 2018, which claims priority from Indian Patent Application No. 201821012572 filed on Apr. 3, 2018, the entire contents of each of which is hereby incorporated by reference.

FIELD OF THE INVENTION

The present invention relates to a manufacturing process of an anti-dust and easily dispersible pigment.

It further relates to the anti-dust and easily dispersible pigment manufactured by the process of the invention, and its use in applications including cosmetics, inks and paints, particularly its use in cosmetics applications.

BACKGROUND OF THE INVENTION

Carbon black has for long been used generally in paints, printing inks, cosmetics, rubbers, resin compositions and the like. Carbon black is used as pigment, filler and the like in the cosmetic industry for numerous applications. Carbon black of fine and ultra-fine particle size like microns or nano meters is used in cosmetics as emulsion, dispersion and the like.

Carbon black is a fluffy powder. It has a very low bulk density. It is generally cohesive and hence, extremely difficult to handle for purposes such as conveying in conventional material transfer equipment and weighing. During material handling some material become airborne. Particularly, carbon black pigment dust particles can become airborne during processing, end use or any other step of handling. Further, it is harmful to personnel, who come into contact with these airborne particulates, upon either inhalation or ingestion of the dust. Additionally, carbon black lacks significant surface functional groups, which hinders its wetting properties thus making it difficult to disperse.

The process of agglomerating fluffy carbon black to form carbon black pellets is generally referred to as pelletizing. Dusting problem of the carbon black is reduced by pelletizing (beading) by various types of mechanical processes, either in dry state, or with the aid of a liquid. Common liquid pelletizing agent is water (U.S. Pat. No. 2,065,371). The other pelletizing agent is oil (U.S. Pat. Nos. 2,635,057; 3,011,902 and 4,102,967) which improves the handling of carbon black pigment and reduces dusting.

However, pelletizing of the carbon black has detrimental effects on the dispersion characteristics of the carbon black. Prior art also teaches to improve the pellet handling characteristics by using different processing aids namely, carbohydrates (e.g. sugar, molasses, soluble starches, saccharides and lignin derivatives; U.S. Pat. No. 2,850,403); rosin emulsion (U.S. Pat. No. 2,908,586), sulphonate and sulphate non-ionic surfactant (U.S. Pat. No. 2,639,225); fatty amine ethoxylate non-ionic surfactant (U.S. Pat. No. 3,565,658); fatty acid or rosin acid ethoxylate (U.S. Pat. No. 3,645,765); and non-ionic surfactants containing poly(ethylene oxide) and poly(dimethyl silicone) groups, molasses and nitric acid (U.S. Pat. No. 3,844,809).

Therefore, there is a need to balance between dusting characteristics and ease of dispersion.

There are various prior arts, where efforts have been taken to resolve these issues to a certain level using low levels of wax or surfactants or any suitable processing aids to form small beads (prill). (Refer prior art namely, MY 128313, DK 176562, DK 176546, DE 19649756, DE 19638042, CA 2209935, WO 2007002030, etc.). The pelletized carbon black powder reduces the tendency of dust propensity and its release into air. However, the pellets are hard and difficult to disperse in liquid, which is essential for cosmetics industry. Thus, it may reduce dust, but it adversely affects dispersion. One of the reasons is the hydrophobicity of the pigment, which affects the dispersion capability of the pigment in aqueous medium.

U.S. Pat. No. 7,033,429 patent claims method of producing low-dust pigment compositions, where pigment was suspended in water, followed by addition of amphoteric surfactant and converting into granules upon drying. These granules are useful in plastics. These granules lead to low dust generation while handling.

JP 2001152072 discloses the pigment compound which is having excellent re-dispersibility but causes slight dust generation tendency. According to this patent, pigment was treated with the polymer and/or cross-linked polyoxyethylene acrylic acid, and the surfactant by lyophilizing in aqueous dispersion.

The most relevant product to the present invention is available under trade name Instant Carbon 50 which is non-nano self water-dispersible pigment of carbon black (CI 77266). It is manufactured by using chemical components C.I. 77266 (Carbon Black D & C no. 2), ceteareth-25, sodium carbonate, sorbitol, citric Acid. During the dispersion of the carbon black, citric acid is added to lower the pH down to about 4. To this, sodium carbonate was added to recover the initial pH of the dispersion.

This product dispersed into water in few minutes without applying high shear. Further, the dispersion obtained has a red tone which adversely affects jetness of the carbon black. This Instant Carbon 50 is used in cosmetics such as mascaras, pencils and eyeliners. Carbon black may perform better quality black shades compared to the ones obtained with black iron oxide but still there is a need to enhance dispersion rate, quality of dispersion and jetness of carbon black pigment which is essential for certain end applications.

Thus, there is need to improve dispersion rate, jetness of carbon black pigment, quality of dispersion i.e. homogeneity and ideally blue tone of the dispersion of the Instant Carbon 50 in water.

Many additional additives and processes have been described in the art, but there has been continuing need for a carbon black product which either eliminates or reduces dusting and at the same time it is easily dispersible in water.

D&C carbon black was approved for cosmetic use by FDC in 2004. It is fluffy powder and has fine particles. But this pigment may create dust level and may easily become airborne. This creates a health hazard to the person who is handling it while transporting or at manufacturing field or at the application site. It also has tendency of heavy aggregation and difficulty in dispersion uniformly. Thus, it may be difficult to avoid or eliminate dusting and at the same time having non-uniform dispersion in aqueous medium with few suspended particles leading to red tone. Thus, it compromises the performance of the carbon black as black pigment in the end applications like cosmetics, inks, paints and the like.

Despite of having potential health hazard, it appeals to cosmetic industry because of its desirable properties in regard to applications.

Thus, there is a need to develop the process for manufacturing anti-dust and easily dispersible pigment, particularly carbon black pigment, which eliminates the problems associated with the carbon black pigment like dusting and enhancing uniform dispersion in the aqueous medium. Similar problems and needs may arise with other pigments.

SUMMARY OF THE INVENTION

An object of the invention is to provide a process for manufacturing anti-dust and easily dispersible pigment, particularly carbon black pigment, which eliminates the problems associated with the prior art, particularly Instant Carbon 50.

Another object of the invention is to provide a process for manufacturing anti-dust and easily dispersible pigment, particularly carbon black pigment, which eliminates dusting and enhances uniform dispersion in the aqueous medium.

Still another object of the invention is to provide a process for manufacturing anti-dust and easily dispersible pigment, particularly carbon black pigment, which enhances jetness of the carbon black and achieves blue tone of the carbon black dispersion in the aqueous medium.

Yet another object of the invention is to provide an anti-dust and easily dispersible pigment, particularly carbon black pigment, which eliminates dusting and disperses in the aqueous medium in at least 15 seconds.

Yet another object of the invention is to provide an anti-dust and easily dispersible pigment, particularly carbon black pigment, which enhances jetness of the carbon black and achieves blue tone of the carbon black dispersion in the aqueous medium.

Yet another object of the invention is to provide use of the anti-dust and easily dispersible pigment, particularly carbon black pigment, in cosmetics, paint and ink.

In the presently claimed invention, it is surprisingly found that when the carbon black pigment is treated with non-ionic surfactant along with the humectant in the ratio of 50 to 60:30 to 50:5 to 15 followed by pH adjustment and subsequent pelletization leads to formation of carbon black pellets which simultaneously eliminates dusting and are easily dispersible in aqueous medium leading to uniform dispersion of the carbon black pigment, enhancing jetness and having blue tone which is ideal for end applications like cosmetics, paint, ink and the likes.

Accordingly, in one embodiment, the presently claimed invention is directed to a manufacturing process for an anti-dust and easily dispersible carbon black pigment;

said process comprising the steps of:

a. admixing at least two non-ionic surfactants selected from the group consisting of alkoxylated polyether, alkoxylated ester, polyglycol ethers, alcohol alkoxylates or alkylphenolpolyglycol ethers with at least one humectant selected from the group consisting of polyhydric alcohol or esters and ethers thereof in water followed by stirring to obtain a clear solution;

b. admixing carbon black pigment into the clear solution of step (a) with constant stirring to obtain a homogeneous composition;

c. adjusting pH of the homogeneous composition of the step (b) to 8 by adding mild alkali followed by stirring the composition until the pH remained constant to 8;

d. finally adjusting the pH of the homogeneous composition of the step (c) in the range of 6 to 6.5 by adding mild acid followed by stirring the composition until the pH remained constant in the range of 6 to 6.5;

e. subjecting the composition of step (d) to first milling followed by spray drying to obtain a powder; and f. granulating the powder to obtain anti-dust and easily dispersible carbon black pigment granules having moisture content in the range of 0.5 to 2% and a mean particle size of at least 200 microns.

Accordingly, in another embodiment of the presently claimed invention, the step (e) comprises the composition of step (d) subjected to first spray drying followed by milling at pressure of 6 to 10 bar to obtain a powder. Particularly, the milling is carried out at 8 bar.

The mean particle size of the powder obtained in the step (e) is in the range of 5 to 10 microns.

Particularly, the spray drying is carried out at temperature of inlet in the range 170 to 200° C. and outlet in the range of 75 to 95° C. More particularly, the temperature of inlet in the range of 170-190° C. and outlet in the range pf 85 to 95° C. Most particularly, temperature of inlet 180° C. and that of outlet 90° C.

Particularly, the spray drying is carried out at of a pressure of inlet in the range 6 to 10 bar, more particularly at 8 bar.

In another embodiment of the presently claimed invention, the non-ionic surfactant is selected from polyoxyethylene ethers of fatty alcohols and acids having $C_{12}$ to $C_{20}$ carbons.

In another embodiment of the presently claimed invention, the non-ionic surfactant is selected from polyoxyethylene ethers of cetearyl alcohol, cetyl alcohol, myristyl alcohol, behenyl alcohol, lauryl alcohol, or isosteryl alcohol. Particularly, at least one of the non-ionic surfactant of the at least two non-ionic surfactants is polyoxyethylene ethers of lauryl alcohol. Other non-ionic surfactant is selected from polyoxyethylene ethers of cetearyl alcohol, cetyl alcohol, myristyl alcohol, behenyl alcohol, or isosteryl alcohol and the like.

In another embodiment of the presently claimed invention, the humectant is selected from glycerol, ethylene glycol, polyethylene glycol (PEG), diethylene glycol, ethylene glycol, tri ethylene glycol, poly ethylene glycol, propylene glycol, dipropylene glycol, glycerin, polyoxy ethylene glycerin, alpha methyl glycerin, urea, triethanolamine lactate, sorbitol, xylitol, sorbide, poly oxy-ethylene sorbitol, mannitol, glucose or propylene glycol glucoside.

In another embodiment of the presently claimed invention, the mild alkali used in step (c) is sodium carbonate, sodium bicarbonate, sodium hydroxide, potassium carbonate, ammonium carbonate and the likes. Typically, it is used as 10% solution in DM water.

In another embodiment of the presently claimed invention, the mild acid used in step (d) is citric acid, lactic acid, acetic acid and the likes. Typically, it is used as 10% solution in DM water.

In another embodiment of the presently claimed invention, the non-ionic surfactant is used in the range of 30 to 46% wt./wt. of the total composition. More particularly, the non-ionic surfactant is used of 35.5% wt./wt. of the total composition.

In another embodiment of the presently claimed invention, the humectant is used in the range of 5 to 10% wt./wt. of the total composition. More particularly, the humectant is used of 7.5% wt./wt. of the total composition In another embodiment of the presently claimed invention, the carbon black pigment is used in the range of 52 to 58% wt./wt. of the total composition. More particularly, the carbon black pigment is used of 55% wt./wt. of the total composition.

In another embodiment of the presently claimed invention, the carbon black pigment is selected from D & C Black pigment no. 2, FW 200, Special black 4, Printex black, Philips black, Black N 330, Black 220 and the likes.

In another embodiment of the presently claimed invention, the carbon black pigment is D & C Black pigment no. 2, particularly for the cosmetics application.

In another embodiment of the presently claimed invention, the carbon black pigment is FW 200, Special black 4, Printex black, Philips black, Black N 330 or Black 220, particularly for the ink and paint application.

Accordingly, in another embodiment, the presently claimed invention is directed to an anti-dust and easily dispersible carbon black pigment having moisture content in the range of 0.5 to 2% and a mean particle size of at least 200 microns prepared according to the process of the invention, the pigment disperses in an aqueous medium in at least 15 seconds.

Preferably, the anti-dust and the easily dispersible carbon black pigment of the presently claimed invention is having moisture content of 1%, a mean particle size of at least 400 microns and it is dispersed in an aqueous medium in at least 20 seconds.

Accordingly, in yet another embodiment, the presently claimed invention is directed to use of the anti-dust and easily dispersible carbon black pigment having moisture content in the range of 0.5 to 2% and a mean particle size at least of 200 microns, in cosmetics, paint, ink, and the likes.

Accordingly, in yet another embodiment, the presently claimed invention is directed to a method for making a cosmetic product; the method comprising blending of the anti-dust and easily dispersible carbon black pigment of the invention and prepare according to the process of the invention with at least one other cosmetic ingredient.

Accordingly, in yet another embodiment, the presently claimed invention is directed to a method for making a water based ink comprising the step of blending of the anti-dust and instantaneously dispersible carbon black pigment of the invention and prepare according to the process of the invention with at least one vehicle or medium of ink along with suitable additive.

Accordingly, in yet another embodiment, the presently claimed invention is directed to a method for making a water based paint comprising the step of blending of the anti-dust and instantaneously dispersible carbon black pigment of the invention and prepare according to the process of the invention with at least one vehicle or medium of paint along with suitable additive.

DETAILED DESCRIPTION OF THE INVENTION

The terms "a," "an," "the" and similar referents used in the context of describing the invention following claims are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Certain embodiments of this invention are described herein, including the best mode known to the inventors for carrying out the invention. Of course, variations on these described embodiments will become apparent to those of ordinary skill in the art upon reading the description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the below-described elements in all possible variations thereof is encompassed by the invention unless otherwise indicated herein or otherwise clearly contradicted by context.

Specific embodiments disclosed herein can be further limited in the claims using consisting of or/and consisting essentially of language. When used in the claims, whether as filed or added per amendment, the transition term "consisting of excludes any element, step, or ingredient not specified in the claims. The transition term "consisting essentially of limits the scope of a claim to the specified materials or steps and those that do not materially affect the basic and novel characteristic(s). Embodiments of the invention so claimed are inherently or expressly described and enabled herein.

As used herein, the term "easily dispersible" refers to a uniform dispersion of pigment in an aqueous medium in or less than 20 seconds.

As used herein, the term "weight percent (wt. To)" when used without qualification, typically refers to the weight percent of a particular solid component, e.g., pigment, humectant, surfactant, etc., as compared with all solid components present, excluding medium or vehicle.

As used herein, the term "composition" refers to a list of ingredients, and/or components, and can also include list of instructions for preparing and mixing together the ingredients, and/or components to make the anti-dust and easily dispersible carbon black pigment.

In the following description, the embodiments are described in sufficient details to enable those skilled in the art to practice the invention. Other embodiments may be utilized and structural, logical and other changes may be made without departing from the spirit and scope of the present invention. The following detailed description is, therefore, not to be taken in a limiting sense. The detailed description that follows begins with a definition section followed by a description of various embodiments of the invention. A series of examples are presented later followed by a brief conclusion.

The wet pelletizing technique has been used in the carbon black industry for more than ten decades. Research has been done during this time, which improved the handling ability of carbon black pigment. However, there has been very little research for developing carbon blacks that would quickly disperse in the aqueous medium, with substantially less or almost no energy/power requirement, and would disperse to a finer level when mixed into aqueous medium than the conventional wet process.

According to the presently claimed invention, there is provided a manufacturing process for an anti-dust and instantaneously dispersible carbon black pigment. The process comprising the followings steps:

a. The at least two non-ionic surfactants are admixed with the at least one humectant in water. This mixture is stirred to obtain a clear solution;
b. The carbon black pigment is added into the clear solution of the step (a) with constant stirring to obtain homogenous composition;
c. The pH of the composition is adjusted initially to 8 by adding mild alkali followed by stirring. The addition of the mild alkali and further stirring is continued until the pH of the composition remains constant to 8;
d. The pH of the composition is adjusted further in the range of 6 to 6.5 by adding mild acid followed by stirring. The addition of the mild acid and further stirring is continued until the pH of the composition remains constant to in the range of 6 to 6.5;
e. The composition of step (d) is first milled to obtain paste comprising fine particles. The composition is particularly milled to obtain paste comprising fine particles having a mean particle size in the range of about 5 to 15 microns. This paste is further subjected to spray drying to obtain powder; and
f. The powder so obtained in step (e) is granulated to obtain anti-dust and instantaneously dispersible carbon black pigment granules having moisture content in the range of 0.5 to 2% and a mean particle size at least of 200 microns.

The ratio of the carbon black pigment to the non-ionic surfactant to the humectant is 50 to 60:30 to 50:5 to 15.

Particularly, the spray drying is carried out at temperature of inlet in the range 170 to 200° C. and outlet in the range of 75 to 95° C., more particularly temperature of inlet is in the range of 170 to 190° C. and outlet is in the range of 85 to 95° C. Most particularly temperature of inlet is 180° C. and that of outlet is 90° C.

Particularly, the spray drying is carried out at a pressure of inlet in the range 6 to 10 bar, more particularly pressure of inlet 8 bar.

Optionally, in the process step (e), the composition of step (d) is subjected to first spray drying followed by milling at a pressure of 6 to 10 bar to obtain a powder comprising fine particles. Particularly the milling is carried out at 8 bar. These particles have a mean particle size in the range of about 5 to 15 microns.

All the steps of the presently claimed process and the preference in which they are carried out are essential to achieve the desired properties namely anti-dust and instantaneous dispersion in the aqueous medium, particularly in at least 15 seconds. Also uniform dispersion which leads to blue tone and enhanced jetness.

The compounds namely, humectant, non-ionic surfactant, mild acid and mild alkali should be acceptable in cosmetics, paint, ink, etc. industry. They also must be compatible with the end application's matrix/medium/vehicle.

The humectant used in the presently claimed invention is polyalcohol. Particularly, it is selected from glycerol, ethylene glycol, polyethylene glycol (PEG), diethylene glycol, ethylene glycol, tri-ethylene glycol, polyethylene glycol, propylene glycol, dipropylene glycol, glycerin, polyoxy ethylene glycerin, alpha-methyl glycerin, urea, triethanolamine lactate, sorbitol, xylitol, sorbide, polyoxy-ethylene sorbitol, mannitol, glucose or propylene glycol glucoside. More particularly, it is selected from sorbitol, xylitol, sorbide, polyoxy-ethylene sorbitol, mannitol, glucose or propylene glycol glucoside. Most particularly, humectant used in sorbitol. The humectant is used in the range of 5 to 15% wt./wt. of the total composition, particularly in the range of 5 to 10% wt./wt. of the total composition. More particularly, the humectant is used of 7.5% wt./wt. of the total composition.

The at least two non-ionic surfactants used in the presently claimed invention may be selected from any non-ionic surfactant which is acceptable to the norms used in the cosmetics, paint, ink, etc. industry and compatible with the matrix/medium/vehicle used in the end applications. Particularly, it is selected from polyoxyethylene ethers of fatty alcohols and acids having $C_{12}$ to $C_{20}$ carbons. More particularly, it is selected from polyoxyethylene ethers of cetearyl alcohol, cetyl alcohol, myristyl alcohol, behenyl alcohol, lauryl alcohol or isosteryl alcohol. Particularly, at least one of the non-ionic surfactant of the at least two non-ionic surfactants is polyoxyethylene ethers of lauryl alcohol. Other non-ionic surfactant may be selected from polyoxyethylene ethers of cetearyl alcohol, cetyl alcohol, myristyl alcohol, behenyl alcohol, or isosteryl alcohol. The non-ionic surfactant is used in the range of 30 to 50% wt./wt. of the total composition, particularly in the range of 30 to 46% wt./wt. of the total composition. More particularly, the non-ionic surfactant is used of 35.5% wt./wt. of the total composition.

The mild alkali used in the step (c) is sodium carbonate, sodium bicarbonate, sodium hydroxide, potassium carbonate, ammonium carbonate and the likes. It is used as 10% solution in DM water.

The mild acid used in the step (d) is citric acid, lactic acid, acetic acid and the likes. It is used as 10% solution in DM water.

In the presently claimed invention, the carbon black pigment is used but the claimed process may be useful to process any other pigments associated with dust problem while handling as well as in the end application and require quick or instantaneous dispersion. Thus, the scope of the presently claimed invention may not be construed to be limiting to the carbon black pigment but to cover all the pigments. The carbon black pigment is used in the range of 50 to 60% wt./wt. of the total composition, particularly in the range of 52 to 58% wt./wt. of the total composition. More particularly, the carbon black pigment is used of 55% wt./wt. of the total composition. The carbon black pigment is intended to cover all grades of carbon black pigments and are commercially available under trade name D & C Black pigment no. 2, FW 200, Special black 4, Printex black, Philips black, Black N 330, Black 220 and the likes.

Particularly, the carbon black pigment is D & C Black pigment no. 2 for the cosmetics application.

Particularly, the carbon black pigment is FW 200, Special black 4, Printex black, Philips black, Black N 330 or Black 220 for the paint or ink applications.

The final pellets of carbon black pigment manufactured by the presently claimed process are having properties namely, non-dusting, instantaneously dispersible in aqueous medium, homogeneous dispersion with blue tone, enhanced jetness, stability at drying temperature, safe and non-toxic. These properties are extremely helpful for the end applications in the field of cosmetics, inks, paints, etc.

Particularly, the anti-dust and easily dispersible carbon black pigment having moisture content in the range of 0.5 to 2% and a mean particle size of at least 200 microns prepared according to the process of the presently claimed invention, disperse in the aqueous medium in at least 15 seconds.

Preferably, the anti-dust and the easily dispersible carbon black pigment of the presently claimed invention is having moisture content of 1%, a mean particle size of at least 400 microns and it is dispersed in an aqueous medium in at least 20 seconds.

The anti-dust and instantaneously dispersible carbon black pigment prepared according to the process of the presently claimed invention, is used in the industry namely cosmetics, paint and ink.

A method for making a cosmetic product comprising the step of blending of the anti-dust and instantaneously dispersible carbon black pigment of the presently claimed invention and manufacturing according to the process of the presently claimed invention with at least one other cosmetic ingredient. It is typically used in the eyeliner, mascara, nail polish, eye shadow, brush-on-brow, lipstick, blushers, rouge, makeup, and foundation.

A method for making a water based ink comprising the step of blending of the anti-dust and instantaneously dispersible carbon black pigment of the presently claimed invention and manufacturing according to the process of the presently claimed invention with at least one additive and vehicle or medium of ink.

A method for making a water based paint comprising the step of blending of the anti-dust and instantaneously dispersible carbon black pigment of the presently claimed invention and manufacturing according to the process of the presently claimed invention with at least one additive and vehicle or medium of paint.

To illustrate the enhanced dispersion properties of carbon black of the presently claimed invention, comparisons of this carbon black and conventional carbon blacks were made. The experiments show that carbon black of the presently claimed invention instantaneously dispersed in water or any other aqueous medium in at least 15 second as compared to that of the commercially available carbon black under the trade name InstantCarbon 50 without stirring. Thus, have substantially reduced energy requirements for mixing and more complete and uniform dispersion as evidenced by blue tone and enhanced jetness. These examples also show that carbon black of the presently claimed invention may have better dispersion in the aqueous medium used in the field namely cosmetics, inks, paintsc, etc.

The present invention is illustrated by the following example, which is not intended to limit the effective scope of the invention.

Chemicals Used
1. Carbon black (D & C Black 2)
2. Sorbitol (75% aqueous solution in water)
3. Monebat-c 1821 (Supplied by Mohini Organic Pvt. Ltd)
4. Lauryl alcohol 4 mole ethoxylated
5. DM Water
6. Citric acid
7. Sodium Carbonate
8. 9 hydroxy propyl methoxy cellulose E-5 (HPMC)

Example 1

To 200 ml of DM water in a container, 10 ml of sorbitol (75% aqueous solution in water), 0.5 gms of lauryl alcohol 4 mole ethoxylated and 35 gms of monebat-c 1821 was added with constant stirring to obtain a clear solution. To this, 55 gms of carbon black powder was added slowly with constant stirring until homogeneous composition in the form of paste was obtained. The pH of the paste was adjusted to 8.0 by adding mild alkali namely sodium carbonate solution in DM water (10%) with constant stirring. Stirring along with addition of mild alkali was continued so that the pH of the paste remained constant to 8. The paste was stirred for another 10 minutes and again checked for pH reading. The pH was constant at 8.0. Further, mild acid namely citric acid solution in DM water (10%) was added to the paste to lower the pH to 6.5 with constant stirring. Similarly, stirring along with addition of mild acid was continued so that the pH of the paste remained constant to 6.5. The paste was stirred for another 10 minutes and again checked for the pH reading. The pH was constant at 6.5.

The above paste was subjected to wet grinding by milling until the mean particle size obtained was of 5 microns. This paste was then subjected to spray drying (temperature and pressure of inlet was 180° C. and 8 bar respectively and temperature of outlet was 90° C.) to obtain pigment in the form of powder having the mean particle size of 5 microns and moisture content of 1%. This powder was then fed to granulator to obtain granules having particle size of 400 microns and moisture content of 1%.

Dust:

We have carried out experiment by dropping the carbon black granules into polyethylene bag from the distance of 1.5 feet, we have observed that there was no generation of dust or particles sticking to walls of the bag. We have also shaken the bag and could not find particle deposits on the walls of the bag or generation of dust into the bag.

Dispersion Rate:

500 mg of granules were poured into 50 ml of DM water and it was found to be dispersed completely in 18 seconds. We had obtained homogeneous dispersion.

Strength:

The strength of the pigment was evaluated and the result of the same is illustrated in the table 1.

Example 2

To 200 ml of DM water in a container, 7.5 gms of sorbitol (75% aqueous solution in water), 0.5 gms of lauryl alcohol 4 mole ethoxylated and 35 gms of monebat-c 1821 was added with constant stirring to obtain a clear solution. To this, 55 gms of carbon black powder was added slowly with constant stirring until homogeneous composition in the form of paste was obtained. The pH of the paste was adjusted to 8.0 by adding mild alkali namely sodium carbonate solution in DM water (10%) with constant stirring. Stirring along with addition of mild alkali was continued so that the pH of the paste remained constant to 8. The paste was stirred for another 10 minutes and again checked for the pH reading. The pH was constant at 8.0. Further, mild acid namely citric acid solution in DM water (10%) was added to the paste to lower the pH to 6.5 with constant stirring. Similarly, stirring along with addition of mild acid was continued so that the pH of the paste remained constant to 6.5. The paste was stirred for another 10 minutes and again checked for the pH reading. The pH was constant at 6.5.

The above paste was then subjected to spray drying (temperature and pressure of inlet was 180° C. and 8 bar respectively and temperature of outlet was 90° C.) to obtain pigment in the form of powder having the moisture content of 1%. This powder was then subjected to grinding by jet milling at air pressure of 8 bar until the mean particle size obtained was of 5 microns. This powder was then fed to granulator to obtain granules having particle size of 400 microns and the moisture content of 1%.

Dust:

We have carried out experiment by dropping the carbon black granules into polyethylene bag from the distance of 1.5 feet, we have observed that there was no generation of dust or particles sticking to walls of the bag. We have also shaken the bag and could not find particle deposition the walls of the bag or generation of dust into the bag.

Dispersion Rate:

500 mg of granules were poured into 50 ml of DM water and it was found to be dispersed completely in 18 seconds. We had obtained homogeneous dispersion.

Strength:

The strength of the pigment was evaluated and the result of the same is illustrated in the table 1.

Example 3

To 200 ml of DM water in a container, 7.5 gms of sorbitol (75% aqueous solution in water) and 35.5 gms of monebat-c 1821 was added with constant stirring to obtain a clear solution. To this, 55 gms of carbon black powder was added slowly with constant stirring until homogeneous composition in the form of paste was obtained. The pH of the paste was adjusted to 8.0 by adding mild alkali namely sodium carbonate solution in DM water (10%) with constant stirring. Stirring along with addition of mild alkali was continued so that the pH of the paste remained constant to 8. The paste was stirred for another 10 minutes and again checked for the pH reading. The pH was constant at 8.0. Further, mild acid namely citric acid solution in DM water (10%) was added to the paste to lower the pH to 6.5 with constant stirring. Similarly, stirring along with addition of mild acid was continued so that the pH of the paste remained constant to 6.5. The paste was stirred for another 10 minutes and again checked for the pH reading. The pH was constant at 6.5.

The above paste was subjected to wet grinding by milling until the mean particle size obtained was of 5 microns. This paste was then subjected to spray drying (temperature and pressure of inlet was 180° C. and 8 bar respectively and temperature of outlet was 90° C.) to obtain pigment in the form of powder having the mean particle size of 5 microns and moisture content of 1%. This powder was then fed to granulator to obtain granules having particle size of 400 microns and moisture content of 1%.

Dust:

We have carried out experiment by dropping the carbon black granules into polyethylene bag from the distance of 1.5 feet, we have observed that there was no generation of dust or particles sticking to walls of the bag. We have also shaken the bag and could not find particle deposits on the walls of the bag or generation of dust into the bag.

Dispersion Rate:

500 mg of granules were poured into 50 ml of DM water and it was found to be dispersed completely in 75 seconds.

Strength:

The strength of the pigment was evaluated and the result of the same is illustrated in the table 1.

Example 4

To 200 ml of DM water in a container, 7.5 gms of sorbitol (75% aqueous solution in water) and 35.5 gms of monebat-c 1821 was added with constant stirring to obtain a clear solution. To this, 55 gms of carbon black powder was added slowly with constant stirring until homogeneous composition in the form of paste was obtained. The pH of the paste was adjusted to 8.0 by adding mild alkali namely sodium carbonate solution in DM water (10%) with constant stirring. Stirring along with addition of mild alkali was continued so that the pH of the paste remained constant to 8. The paste was stirred for another 10 minutes and again checked for pH reading. The pH was constant at 8.0. Further, mild acid namely citric acid solution in DM water (10%) was added to the paste to lower the pH to 6.5 with constant stirring. Similarly, stirring along with addition of mild acid was continued so that the pH of the paste remained constant to 6.5. The paste was stirred for another 10 minutes and again checked for the pH reading. The pH was constant at 6.5.

The above paste was then subjected to spray drying (temperature and pressure of inlet was 180° C. and 8 bar respectively and temperature of outlet was 90° C.) to obtain pigment in the form of powder having the moisture content of 1%. This powder was then subjected to grinding by jet milling at air pressure of 8 bar until the mean particle size obtained was of 5 micron. This powder was then fed to granulator to obtain granules having particle size of 400 microns and the moisture content of 1%.

Dust:

We have carried out experiment by dropping the carbon black granules into polyethylene bag from the distance of 1.5 feet, we have observed that there was no generation of dust or particles sticking to walls of the bag. We have also shaken the bag and could not find particle deposits on the walls of the bag or generation of dust into the bag.

Dispersion Rate:

500 mg of granules were poured into 50 ml of DM water and it was found to be dispersed completely in 75 seconds.

Strength:

The strength of the pigment was evaluated and the result of the same is illustrated in the table 1.

Comparative Example 1

To 200 ml of DM water in a container, 7.5 gms of sorbitol (75% aqueous solution in water) was added with constant stirring to obtain a clear solution. To this, 55 gms of carbon black powder was added slowly with constant stirring until homogeneous composition in the form of paste was obtained. The pH of the paste was adjusted to 8.0 by adding mild alkali namely sodium carbonate solution in DM water (10%) with constant stirring. Stirring along with addition of mild alkali was continued so that the pH of the paste remained constant to 8. The paste was stirred for another 10 minutes and again checked for pH reading. The pH was constant at 8.0. Further, mild acid namely citric acid solution in DM water (10%) was added to the paste to lower the pH to 6.5 with constant stirring. Similarly, stirring along with addition of mild acid was continued so that the pH of the paste remained constant to 6.5. The paste was stirred for another 10 minutes and again checked for the pH reading. The pH was constant at 6.5. The pigment was converted into a lump. This lump was not processed further.

Comparative Example 2

To 200 ml of DM water in a container, 35 gms of monebat-c 1821 was added with constant stirring to obtain a clear solution. To this, 55 gms of carbon black powder was added slowly with constant stirring until homogeneous composition in the form of paste was obtained. The pH of the paste was adjusted to 8.0 by adding mild alkali namely sodium carbonate solution in DM water (10%) with constant stirring. Stirring along with addition of mild alkali was continued so that the pH of the paste remained constant to 8. The paste was stirred for another 10 minutes and again checked for the pH reading. The pH was constant at 8.0.

Further, mild acid namely citric acid solution in DM water (10%) was added to the paste to lower the pH to 6.5 with constant stirring. Similarly, stirring along with addition of mild acid was continued so that the pH of the paste remained constant to 6.5. The paste was stirred for another 10 minutes and again checked for the pH reading. The pH was constant at 6.5. The pigment was converted into a lump. This lump was not processed further.

Comparative Example 3

To 200 ml of DM water in a container, 7.5 gms of sorbitol (75% aqueous solution in water) and 35 gms of monebat-c 1821 was added with constant stirring to obtain a clear solution. To this, 55 gms of carbon black powder was added slowly with constant stirring.

The above paste was then subjected to spray drying (temperature and pressure of inlet was 180° C. and 8 bar respectively and temperature of outlet was 90° C.) to obtain pigment in the form of powder having the moisture content of 1%. This powder was then subjected to grinding by jet milling at air pressure of 8 bar until the mean particle size obtained was of 5 microns. This powder was then fed to granulator to obtain granules having particle size of 400 microns and the moisture content of 1%.

Dust:

We have carried out experiment by dropping the carbon black granules into polyethylene bag from the distance of 1.5 feet, we have observed that there was generation of small amount of dust or particles sticking to walls of the bag. We have also shaken the bag and found particle deposits on the walls of the bag or generation of dust into the bag.

Dispersion Rate:

500 mg of granules were poured into 50 ml of DM water and it was found to be dispersed completely in 120 seconds.

Comparative Example 4

Instant Carbon 50 (Prodotti Gianni)

The commercial carbon black pigment under the trade name Instant carbon 50 (Prodotti Gianni) were tested for dust generation, rate of dispersion of pigment in water, jetness, and Blackness.

Dust:

We have carried out experiment by dropping the carbon black granules into polyethylene bag from the distance of 1.5 feet, we have observed that there was no generation of dust or particles sticking to walls of the bag. We have also shaken the bag and could not find particle deposits on the walls of the bag or generation of dust into the bag.

Dispersion Rate:

500 mg of granules were poured into 50 ml of DM water and it was found to be dispersed completely in 80 seconds.

Strength:

The strength of the pigment was evaluated and the result of the same is illustrated in the table 1.

Method for Evaluation of Strength:

Sample Preparation:

For the sample preparation, the pigment prepared according to the examples 1 to 4 was used. Accordingly four samples i.e. "A". "B", "C" and "D" from examples 1 to 4 respectively were made by using the following steps:
1. 0.150 gm of pigment was accurately weighed and was mixed with 1.0 gm of hydroxy propyl methoxy cellulose grade E-5 (HPMC E-5). To this, 2 ml of water was added and the mixture was stirred.
2. The mixture was ground in muller at 100 rpm twice at a pressure of 40 Kg.
and
3. The paste was collected and drawdowns were made on the hard paper. This drawdown is used as sample for further strength testing.

Standard Preparation:

For the standard preparation, the pigment according to the comparative example 4 i.e. instant carbon 50 was used. Accordingly four samples were made by using the following steps:
1. 0.150 gm of pigment was accurately weighed and was mixed with 1.0 gm of hydroxy propyl methoxy cellulose grade E-5 (HPMC E-5). To this, 2 ml of water was added and the mixture was stirred.
2. The mixture was ground in muller at 100 rpm twice at a pressure of 40 Kg.
and
3. The paste was collected and drawdowns were made on the hard paper. This drawdown is used as standard for further strength testing.

The sample and standard was tested for strength by using previously calibrated spectrophotometer (model—Hunter Lab Data Colour DC 550, Serial No. 8812411). The results of the same are illustrated in the table 1.

TABLE 1

| | Strength As is Colour Difference on strength adjusted to 100% | | | | |
|---|---|---|---|---|---|
| | Standard | A | B | C | D |
| $L^*$ | 21.152 | 21.138 | 21.116 | 21.187 | 20.423 |
| $DL^*$ | | −0.014 | −0.036 | 0.035 | 0.020 |
| | | Darker | Darker | Lighter | Lighter |
| $a^*$ | −0.357 | −0.188 | −0.244 | −0.289 | −0.190 |
| $Da^*$ | | 0.169 | 0.113 | 0.068 | 0.022 |
| | | Less Green | Less Green | Less Green | Less Green |
| $b^*$ | −0.695 | −0.720 | −0.832 | −0.588 | −0.699 |
| $Db^*$ | | −0.025 | −0.137 | 0.107 | 0.228 |
| | | Bluer | Bluer | Less Blue | Less Blue |
| $C^*$ | 0.781 | 0.744 | 0.867 | 0.655 | 0.724 |
| $DC^*$ | | −0.037 | 0.086 | −0.126 | −0.227 |
| | | Duller | Brighter | Duller | Duller |
| $H^*$ | 242.787 | 255.336 | 253.626 | 243.800 | 254.763 |
| $DH^*$ | | 0.167 | 0.156 | 0.013 | −0.034 |
| $DE^*$ | | 0.171 | 0.181 | 0.132 | 0.230 |
| K/S | 176.235 | 182.828 | 178.077 | 170.841 | 184.849 |
| RFL | 4.233 | 4.120 | 4.178 | 4.481 | 4.076 |
| Strength Integral % | | 103.741% | 101.045 | 96.939 | 97.361 |

Observer = 10 degree
Colour Space = CIE Lab 1976
Illuminant = D65 10 Degree
Spectral mode = DC 550
Serial Number = 8812411
Mode = % R According to the results, it is observed that pigments i.e. samples (A) and (B) prepared according to the examples 1 and 2 of the invention are more black as well as having more bluer tone as compared to that of standard. However, the sample (C) and (D) prepared according to the examples 3 and 4 are less black as well as having lesser blue tone as compared to that of standard.

The presently claimed invention facilitates anti-dusting pigments to be provided that are convenient to handle and do not generate potentially hazardous airborne particles while handling, or during transportation or during any suitable processing conditions employed in end applications in the relevant industry including cosmetics, paint, and ink. Thus, it is safe and non-toxic to the employee or the person who is exposed to this pigment. It is converted into granules of required size as per the end applications. Instantaneous dispersion in at least 15 seconds in the medium makes it useful in the end application and reduces power requirement during dispersion. The dispersion of the pigment of the presently claimed invention has blue tone and enhanced jetness as compared to that of commercial carbon black pigment. The anti-dust and instantaneous dispersible pigment of the presently claimed invention is cosmetically compatible and useful in the end applications including eyeliner, mascara, nail polish, eye shadow, brush-on-brow, lipstick, blushers, rouge, makeup, and foundation.

The present invention has been described with reference to preferred embodiments, purely for the sake of understanding and not by way of any limitation and the present invention includes all legitimate developments within the scope of what has been described hereinbefore and claimed in the appended claims.

The invention claimed is:

1. A method of manufacturing an anti-dust and easily dispersible carbon black pigment, the method comprising:
    admixing non-ionic surfactants including at least two of, alkoxylated polyethers, alkoxylated esters, polyglycol ethers, alcohol alkoxylates, and alkylphenol polyglycol ethers, with at least one humectant including at least one of, polyhydric alcohol, esters of polyhydric alcohol, and ethers of polyhydric alcohol in water, to obtain a clear solution;
    admixing carbon black pigment into the clear solution to obtain a homogeneous composition;
    adjusting pH of the homogeneous composition to 8 by mixing alkali into the composition until the pH remains constant at 8;
    again adjusting the pH of the homogeneous composition from 8 to 6 to 6.5 by mixing acid into the homogenous composition until the pH remains constant at 6 to 6.5;
    first milling and then spray drying the composition of pH 6 to 6.5 to obtain a powder; and
    granulating the powder to obtain anti-dust and easily dispersible carbon black pigment having a moisture content of 0.5 to 2% and a mean particle size of at least 200 microns.

2. The method of claim 1, wherein the first milling includes milling at a pressure of 6 to 10 bar to obtain the powder.

3. The method of claim 1, wherein the mean particle size of the powder is 5 to 10 microns.

4. The method of claim 1, wherein the non-ionic surfactants include polyoxyethylene ethers of fatty alcohols or acids having $C_{12}$ to $C_{20}$ carbons.

5. The method of claim 4, wherein the non-ionic surfactants include polyoxyethylene ethers of cetearyl alcohol, cetyl alcohol, myristyl alcohol, behenyl alcohol, lauryl alcohol, or isosteryl alcohol.

6. The method of claim 1, wherein the non-ionic surfactants include polyoxyethylene ethers of lauryl alcohol.

7. The method of claim 6, wherein the non-ionic surfactants further include polyoxyethylene ethers of cetearyl alcohol, cetyl alcohol, myristyl alcohol, behenyl alcohol, or isosteryl alcohol.

8. The method of claim 1, wherein the humectant includes glycerol, ethylene glycol, polyethylene glycol (PEG), diethylene glycol, triethylene glycol, propylene glycol, dipropylene glycol, polyoxy ethylene glycerin, alpha methyl glycerin, urea, triethanolamine lactate, sorbitol, xylitol, sorbide, poly oxy-ethylene sorbitol, mannitol, glucose, or propylene glycol glucoside.

9. The method of claim 1, wherein the non-ionic surfactant is 30 to 50% by weight of the total composition.

10. The method of claim 1, wherein the humectant is 5 to 15% by weight of the total composition.

11. The method of claim 1, wherein the carbon black pigment is 50 to 60% by weight of the composition.

12. The method of claim 1, wherein the non-ionic surfactants include an acid having a molecular formula with 12-20 carbon atoms.

13. The method of claim 1, wherein the acid is a weak organic acid, and wherein the alkali is a weak alkaline or ammonium compound.

14. The method of claim 1, wherein the acid includes citric acid of around 10% concentration in water, and wherein the alkali includes sodium carbonate of around 10% concentration in water.

15. The method of claim 1, wherein the homogeneous composition formed from admixing the carbon black pigment is a paste.

16. The pigment formed by the method of claim 1, wherein the pigment disperses in an aqueous medium in at least 15 seconds.

17. A method for making a cosmetic product; the method comprising:
    blending the pigment formed by the method of claim 1 with at least one other cosmetic ingredient, wherein the pigment disperses in an aqueous medium in at least 15 seconds.

18. A method for making a water based ink, the method comprising:
    blending the pigment formed by the method of claim 1 with at least one vehicle or medium of ink along with suitable additive, wherein the pigment disperses in an aqueous medium in at least 15 seconds.

19. A method for making a water based paint, the method comprising: blending the pigment formed by the method of claim 1 with at least one vehicle or medium of paint along with suitable additive, wherein the pigment disperses in an aqueous medium in at least 15 seconds.

* * * * *